(12) United States Patent
Richter (10) Patent No.: US 10,308,191 B2
(45) Date of Patent: Jun. 4, 2019

(54) VENTILATION-MOUNTED HOLDER, IN PARTICULAR FOR ELECTRONIC DEVICES

(71) Applicant: Harald Richter, Engelsbrand (DE)

(72) Inventor: Harald Richter, Engelsbrand (DE)

( * ) Notice: Subject to any disclaimer, the term of this patent is extended or adjusted under 35 U.S.C. 154(b) by 2 days.

(21) Appl. No.: 15/798,485

(22) Filed: Oct. 31, 2017

(65) Prior Publication Data

US 2018/0134231 A1   May 17, 2018

(30) Foreign Application Priority Data

Nov. 15, 2016 (DE) .......................... 20 2016 007 019
Aug. 3, 2017 (DE) .......................... 20 2017 004 085

(51) Int. Cl.
*B60R 11/02* (2006.01)
*B60R 11/00* (2006.01)

(52) U.S. Cl.
CPC .............. *B60R 11/02* (2013.01); *B60R 11/00* (2013.01); *B60R 11/0241* (2013.01); *B60R 11/0252* (2013.01); *B60R 2011/007* (2013.01); *B60R 2011/0008* (2013.01); *B60R 2011/0059* (2013.01); *B60R 2011/0089* (2013.01)

(58) Field of Classification Search
CPC ................. B60R 11/02; B60R 11/0252; B60R 2011/0059; B60R 2011/007; B60R 11/0241; B60R 2011/0008
USPC ........................................................ 224/483
See application file for complete search history.

(56) References Cited

U.S. PATENT DOCUMENTS

| | | | | |
|---|---|---|---|---|
| 4,852,843 A * | 8/1989 | Chandler | ............... | B60N 3/103 248/311.2 |
| 5,593,124 A * | 1/1997 | Wang | ...................... | B60R 11/00 224/483 |
| 5,961,083 A * | 10/1999 | Hartmann | ............... | B60N 3/101 248/222.14 |
| 5,979,724 A * | 11/1999 | Loewenthal, Jr. | .......................... | B60R 11/0241 224/483 |
| 6,138,969 A * | 10/2000 | Olausson | ................ | B60R 11/02 224/483 |
| 7,766,294 B2 * | 8/2010 | Schimmeyer | .......... | B60N 3/103 220/482 |
| 7,857,178 B2 * | 12/2010 | Brown, Jr. | .......... | B60R 11/0247 224/483 |

(Continued)

FOREIGN PATENT DOCUMENTS

DE   102007034810 A1   9/2008

OTHER PUBLICATIONS

European Patent Application No. 17001709.9-1132; European Search Report dated Jan. 18, 2018; 5 pages.

*Primary Examiner* — Nathan J Newhouse
*Assistant Examiner* — Lester L Vanterpool
(74) *Attorney, Agent, or Firm* — John H. Thomas, P.C.

(57) ABSTRACT

A ventilation-mounted holder for attachment on a ventilation lamella assembly in vehicles for mounting electronic devices or other articles includes a carrier body onto which a holding bracket for engagement over a ventilation lamella is arranged on the backside, and a holding device for a smartphone or a tablet is arranged on the front side. The carrier body is configured as an elongated carrier arm. The holding bracket and at least one further holding bracket are each arranged rotatably and spaced apart from one another on an end region of the carrier arm, and the holding device is arranged on the opposite end region of the carrier arm.

5 Claims, 7 Drawing Sheets

(56) References Cited

U.S. PATENT DOCUMENTS

| | | | | |
|---|---|---|---|---|
| 8,322,584 B2* | 12/2012 | Dethmers | .......... | B60H 1/00592 |
| | | | | 224/268 |
| 8,573,455 B1* | 11/2013 | Brown | ................ | B60R 11/0247 |
| | | | | 224/483 |
| 9,080,714 B2* | 7/2015 | Minn | .................. | B60R 11/0241 |
| 9,718,412 B2* | 8/2017 | Minn | .................. | B60R 11/0241 |
| 9,744,913 B2* | 8/2017 | Ormsbee | ............. | B60R 11/0241 |
| 9,868,532 B2* | 1/2018 | Balmer | ................ | F16M 13/022 |
| 2004/0040994 A1* | 3/2004 | Parcelles | ................. | B60N 3/08 |
| | | | | 224/483 |
| 2005/0236541 A1* | 10/2005 | Chang | .................... | B60R 11/00 |
| | | | | 248/231.81 |
| 2008/0224007 A1* | 9/2008 | Mo | ......................... | B60R 11/00 |
| | | | | 248/231.81 |
| 2010/0327031 A1* | 12/2010 | Olmos | ...................... | A45F 5/02 |
| | | | | 224/269 |
| 2014/0103087 A1* | 4/2014 | Fan | ......................... | B60R 11/02 |
| | | | | 224/544 |

* cited by examiner

VENTILATION-MOUNTED HOLDER, IN PARTICULAR FOR ELECTRONIC DEVICES

This application claims the priority of filing of German Patent Application No. 20 2016 007 019.4, filed Nov. 15, 2016, and German Patent Application No. 20 2017 004 085.9, filed Aug. 3, 2017, the contents of both applications which are incorporated herein by reference in their entirety.

The invention relates to a ventilation-mounted holder, in particular for electronic devices such as smartphones or tablet computers in automobiles.

BACKGROUND

Such ventilation-mounted holders are already known in several configurations and comprise a carrier body on the backside of which are arranged a backwardly protruding holding bracket for engaging around a ventilation lamella in the automobile, and a support element to fix the ventilation-mounted holder onto the ventilation lamella assembly. A holding device or an adapter for attaching a holding device for a smartphone or a tablet is then disposed on the front side of the carrier body by means of a joint.

Ventilation-mounted holders present an alternative for suction cup holders that can be attached to the windscreen or the dashboard with the help of a suction cup. It is however often impossible to fix such a suction cup holder on the dashboard, due to the lack of sufficiently smooth and appropriately positioned attachment surfaces; in addition, when attaching them to the windscreen, this inevitably creates visual obstructions. For this reason, ventilation-mounted holders have proven to be an alternative preventing such problems.

However, ventilation-mounted holders present other types of problems. On the one hand, covering the ventilation slots blocks the outflow of air, and on the other hand, cold air exiting the slots when using the air conditioning in summer, or hot air exiting the slots when using the heating in winter, could affect the operation of the smartphones or tablet computers.

A ventilation-mounted holder allowing for a partial offset of the arrangement of the held device upwards or downwards with respect to the ventilation lamella assembly is also known. With this known ventilation-mounted holder, a bracket for fixing on a ventilation lamella is provided on one end on the backside of a relatively short arm, and a pair of clamping jaws for holding the device is arranged on the front side in the region of the other end of the arm. Here the bracket is rotatably disposed on the respective end of the arm so that the arm can also be pivoted in the lateral direction, and the arm and the bracket can be secured in the respectively selected rotary position. However, this known ventilation-mounted holder proves to be a rather instable construction since it has no support at all with the exception of the bracket for engaging over a ventilation lamella.

SUMMARY

It is an object of the invention to overcome the problems stated above.

According to the invention, this object is achieved in that the carrier body is configured as a carrier arm. On one end region of the carrier arm there are provided at least two holding brackets that are each rotatable and spaced apart from each other. On its other end region on the front side, a holding device or an adapter for attaching a holding device for a smartphone or a tablet is arranged.

With the ventilation-mounted holder according to the invention, the carrier arm can be of substantial length so that the device to be held is located at least substantially outside of the air outlet area of the ventilation lamella assembly, i.e. above or below, or even to the side of the air outlet area.

Providing at least two holding brackets, each rotatably arranged on the carrier arm and serving for engagement around a ventilation lamella confers the ventilation-mounted holder a stable fixation on the ventilation lamella assembly, since this fixation is thereby achieved on at least two positions spaced apart from each other along the length of the carrier arm. Usually, these will be on different ventilation lamellas and as such not only guarantee a firm mounting of the ventilation-mounted holder without wobble but also prevent overstraining or damaging the ventilation lamellas. With the conventional ventilation-mounted holder configured with an arm, this risk is significant, since no additional support other than the holding bracket is provided. Due to the rotatability of the arm with respect to the holding bracket there is no possibility for an additional support on the backside, as would be the case with ventilation-mounted holders without arm and seated immediately in front of the ventilation lamella assembly. The known ventilation-mounted holder with the rotatable arm therefore always causes a significant torque on the lamella to which it is fixed, thus leading to the instability of this mounting and creating the risk of damaging the lamella.

The ventilation-mounted holder according to the invention also allows for an optional oblique or horizontal positioning of the carrier arm, wherein the mounting in each case is achieved on at least two spaced apart positions of the ventilation lamella assembly, and normally on two different lamellas, thus rendering the mounting stable and wobble-free.

The ventilation-mounted holder according to the invention is also suited for the mounting of door opening controls or other devices or apparatuses, for example a shelf.

An advantageous refinement of the invention is that each of the two holding brackets can forcibly be closed or opened by means of a finger-actuated hand wheel through an appropriate driving mechanism. Thus, the holding force is independent of any spring biasing, and in each case a firm engagement over the respective lamella, and as such a firm seat of the carrier, can be achieved instead. This also allows for the accommodation of ventilation lamellas having different thicknesses that can then be firmly be engaged over independently of their respective thickness. At the same time, since the holding brackets can forcibly be opened when installing or removing the carrier arm, the respective ventilation lamellas are stressed to a lesser extent than this would be the case with spring-biased holding bracket elements.

In another embodiment of the ventilation-mounted holder according to the invention, consisting of two holding bracket elements engaging over the respective ventilation lamella, use is made of holding hooks that engage around the back edge of the respective ventilation lamella and can be moved in the longitudinal direction between a release position and a holding position by means of a finger-actuated hand wheel through an appropriate driving arrangement.

BRIEF DESCRIPTION OF THE DRAWINGS

An exemplary embodiment of the invention will now be described in greater detail with reference to the accompanying drawings, in which.

DETAILED DESCRIPTION

Figure 1:
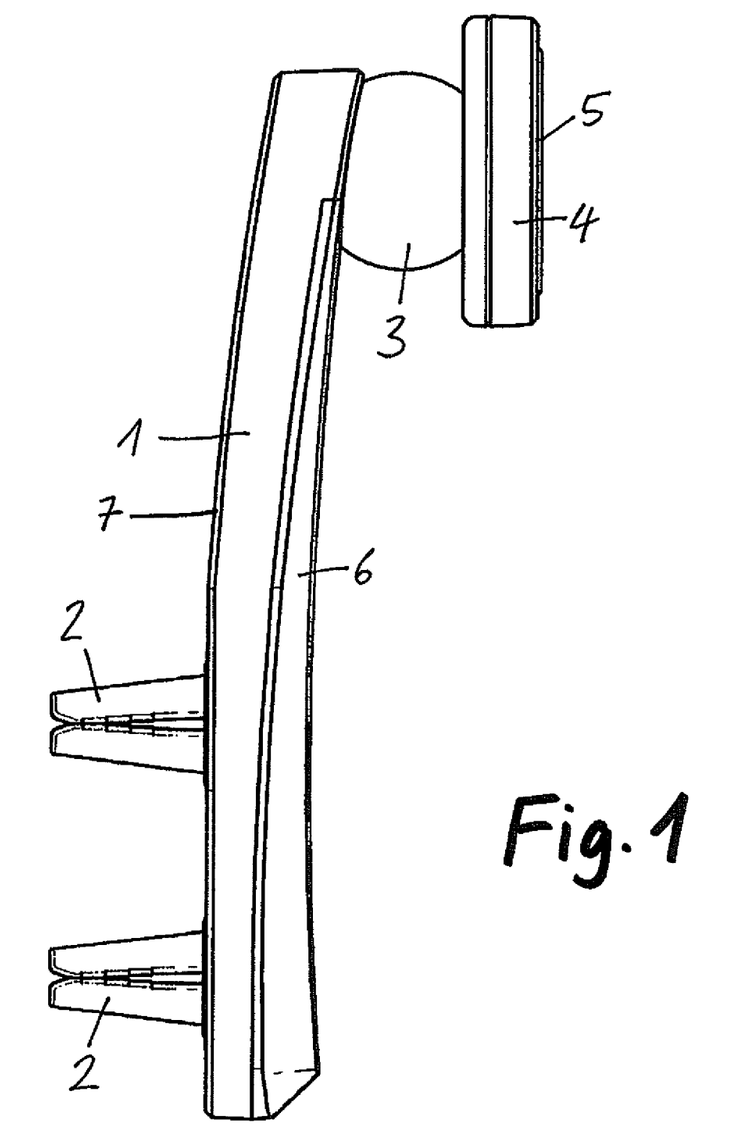
FIG. 1 shows a ventilation-mounted holder according to the invention in a side view.
Figure 2:
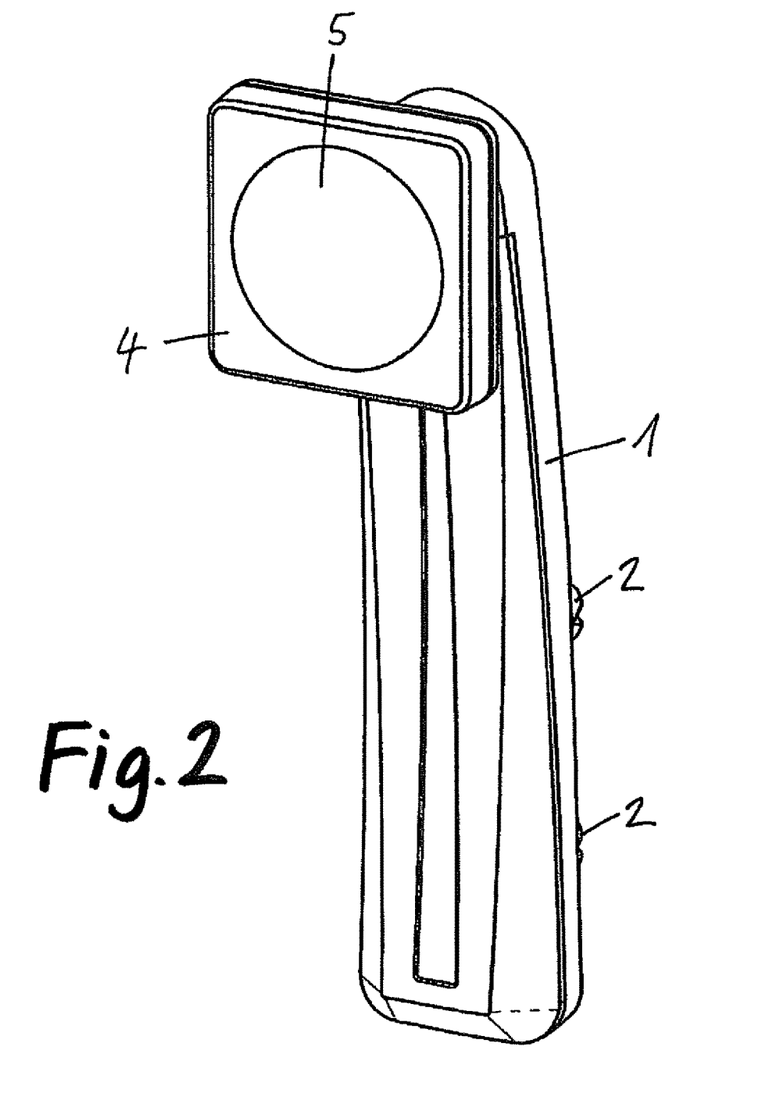
FIG. 2 shows the ventilation-mounted holder in a perspective front view.
Figure 3:
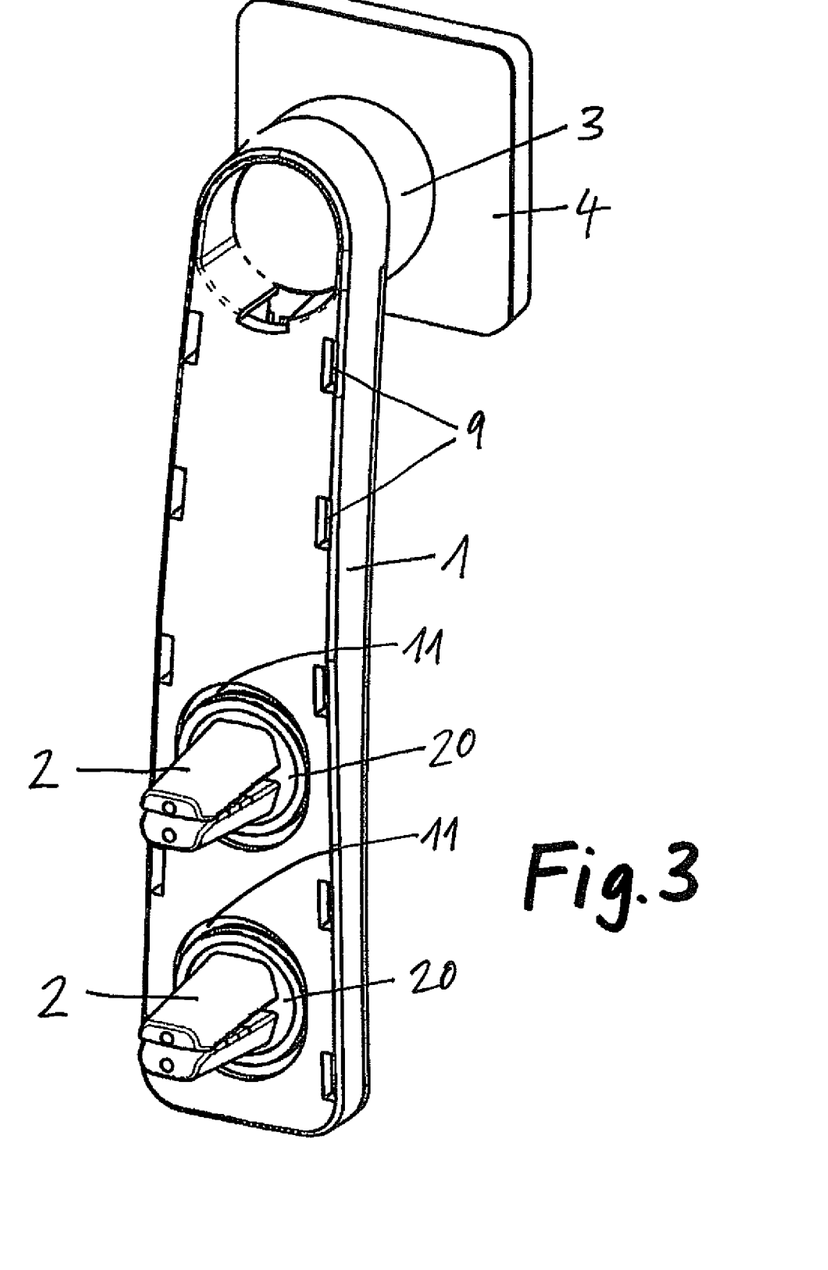
FIG. 3 shows the ventilation-mounted holder in a perspective rear view.

In the exemplary embodiment shown here, the ventilation-mounted holder according to the invention consists of a carrier arm 1, two holding brackets 2 disposed on the backside thereof, and a mounting 4 arranged on the front side of the carrier arm and connected thereto via a universal joint 3.

In this exemplary embodiment, the holder 4 is shown as a magnetic holder having a magnetic plate 5. It could however also be configured as a claw plate or an adapter configured in some other way in order to connect to a holding shell for receiving the device to be held, or directly as a holding shell or another apparatus adapted to hold the device to be received by it. The universal joint 3 may be configured in any suitable way and is not shown in detail.

The carrier arm 1 is embodied as a half-shell structure forming a box-like body, that is, a front half shell 6 and a rear half shell 7. In this way, it is very light in terms of weight, but still quite stable and torsionally stiff.

The two holding brackets 2 disposed on the backside of the carrier arm 1 in each case serve for engaging over a ventilation lamella. They are disposed spaced apart along the carrier arm 1 and in each case connected with a holding body guided in the carrier arm 1 by means of a rotating joint 20. Optionally, three holding brackets could be provided. Each rotating joint 20 is configured in such a way that it will allow for rotation in order to adjust the desired rotational position, but will be stable in the adjusted position in order to allow for a wobble-free fixation of the ventilation-mounted holder on the ventilation lamella assembly.

As will be seen from FIG. 3, each holding bracket 2 is arranged with its rotating joint 20 in an opening 11 of the carrier arm in the form of an elongated hole, and the respective holding body is displaceable in the carrier arm in such a way that each holding bracket 2 can be displaced by a certain distance along the carrier arm 1 to allow for any necessary compensational movements.

The two half shells 6 and 7 of the carrier arm 1 are interconnected by a series of latches that are only schematically indicated in the rear view of FIG. 3. It will be appreciated that other connection means, in particular glueing or welding, are also possible.

FIGS. 4 to 7 show a refinement of the ventilation-mounted holder according to the invention wherein the holding brackets 2 are each forcibly moveable between an opening position and a closing position by means of a finger-actuated small hand wheel 21.

Figure 4:
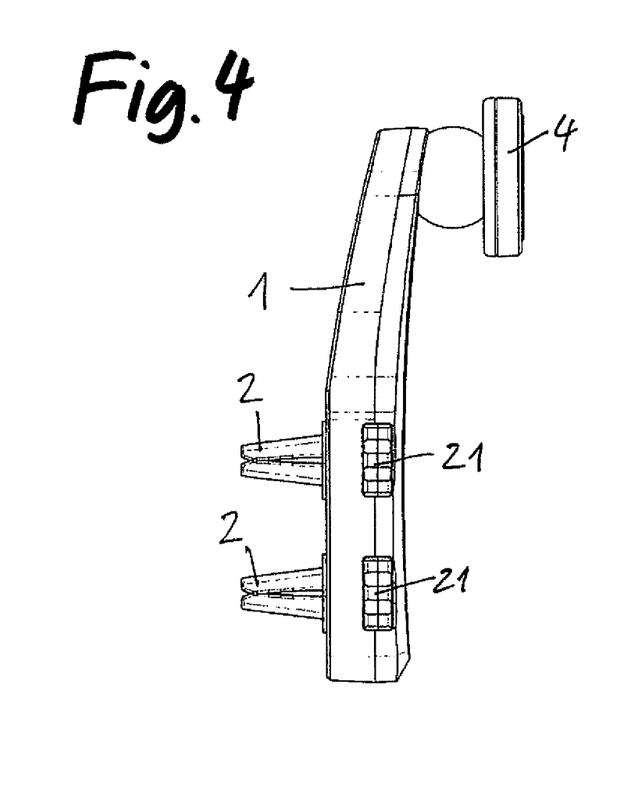
FIGS. 4 and 5 show, in a side view and a perspective view obliquely from the front, respectively, a ventilation-mounted holder with holding brackets that can be opened or closed by means of small hand wheels.
Figure 5:
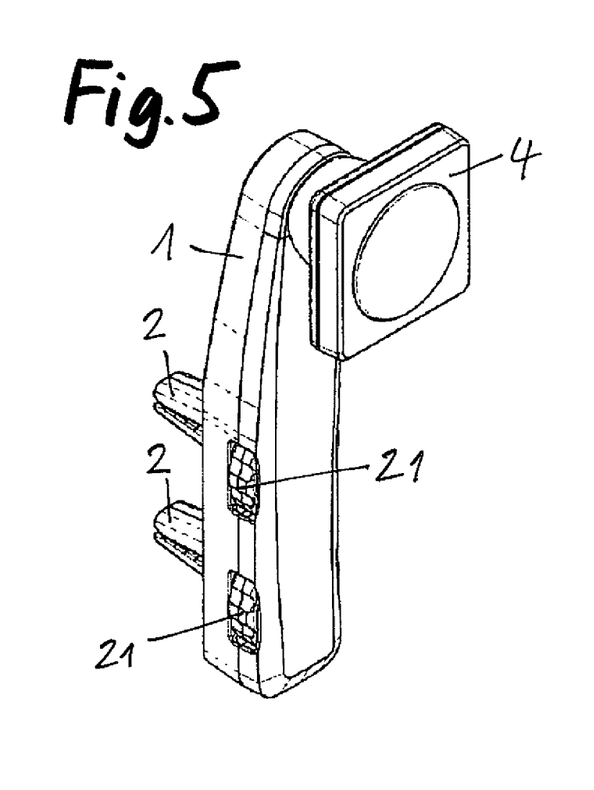

FIGS. 4 and 5 show, in a side view and a perspective view obliquely from the front, respectively, the ventilation-mounted holder with the small hand wheels 21 that at both sides laterally protrude slightly from the carrier arm 1 through a respective window in order to be actuated with two fingers.

Figure 6:
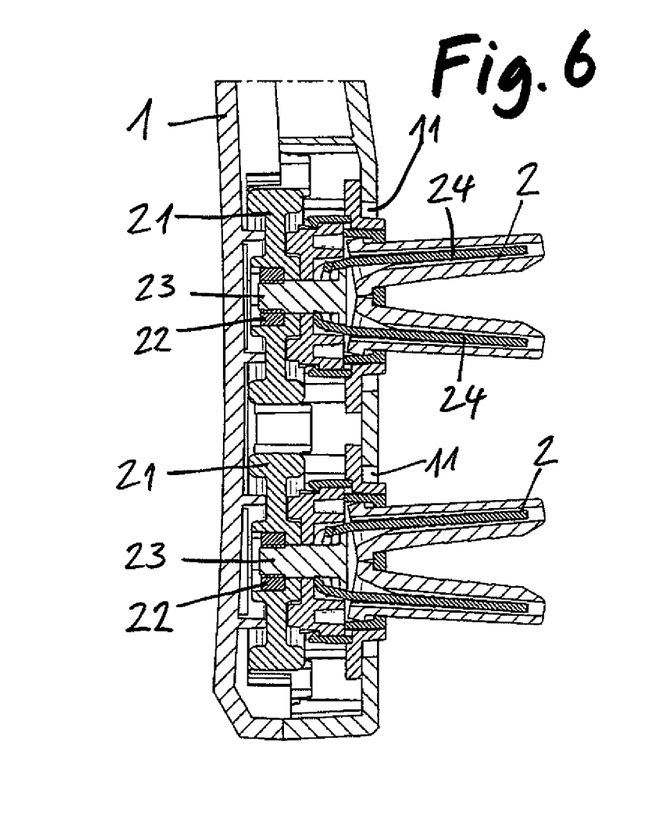
FIGS. 6 and 7 show, in an enlarged sectioned view, the mechanism of the holding brackets with the small hand wheels serving for their opening and closing in the open (FIG. 6) and in the closed (FIG. 7) positions of the holding brackets.
Figure 7:
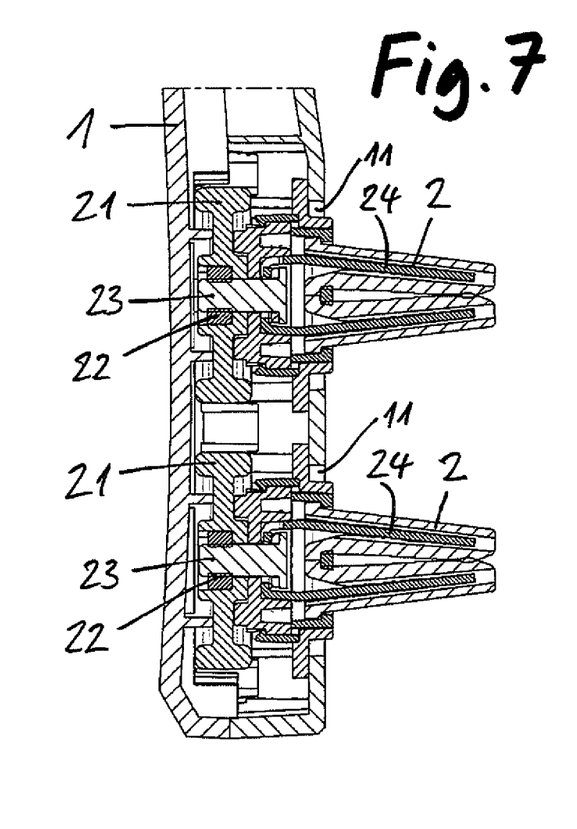

FIGS. 6 and 7 show the actuating mechanism for the holding brackets 2 in enlarged sectioned views. The mechanism consists of the small hand wheel 21 with an integrated, rotationally fixed screw nut 22 acting on a threaded pin 23 that is axially moved with rotation of the axially fixed small hand wheel 21. As can easily be seen in the drawings of FIGS. 6 and 7, the two bracket elements 2 are provided with spring clip inserts 24 that cooperate with a head of the stem 23 remote from the small hand wheel 21 in such a way that an axial movement of the stem 23 to the right in the drawing brings about the opening, and the movement to the left in the drawing brings about the closing of the holding brackets 2. The opened position is visible in FIG. 6, and the closed position is visible in FIG. 7.

FIGS. 8 to 11 show an alternative embodiment of the ventilation-mounted holder wherein the holding brackets 2 of the embodiments previously described are replaced by holding hooks 8 which are again movable between a release position and a holding position, as in the previous embodiments by means of finger-actuated small hand wheels 81.

Figure 8:
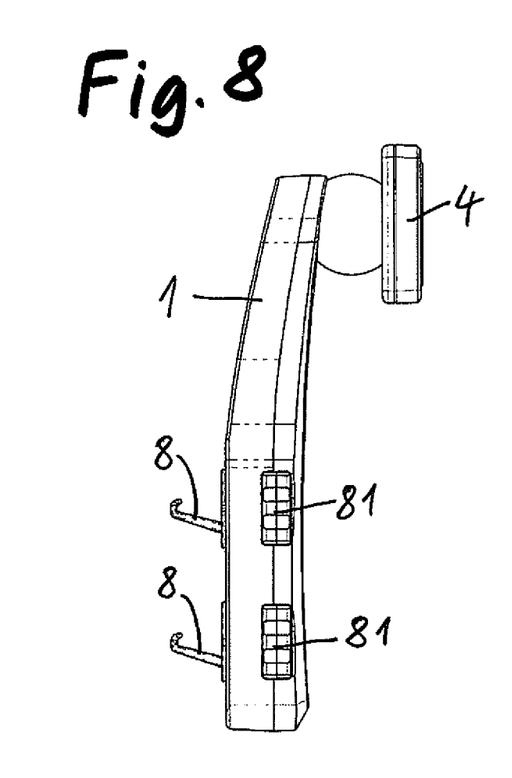
FIGS. 8 and 9 show an alternative embodiment of the ventilation-mounted holder in a side view and in a perspective view, respectively, obliquely from behind, wherein the holding brackets of the embodiment of FIGS. 4 to 7 are replaced with holding hooks that are moveable between a release position and a holding position by means of finger-actuated small hand wheels.
Figure 9:
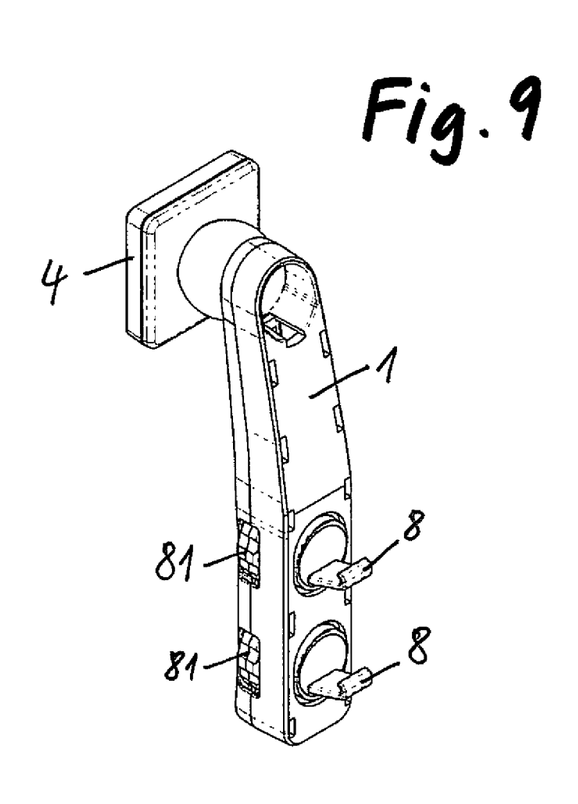

FIGS. 8 and 9 show this embodiment in a side view and in a perspective view obliquely from behind, wherein the small hand wheels 81 again slightly protrude out of the carrier arm 1 through windows at both sides in order to be movable by two fingers.

Figure 10:
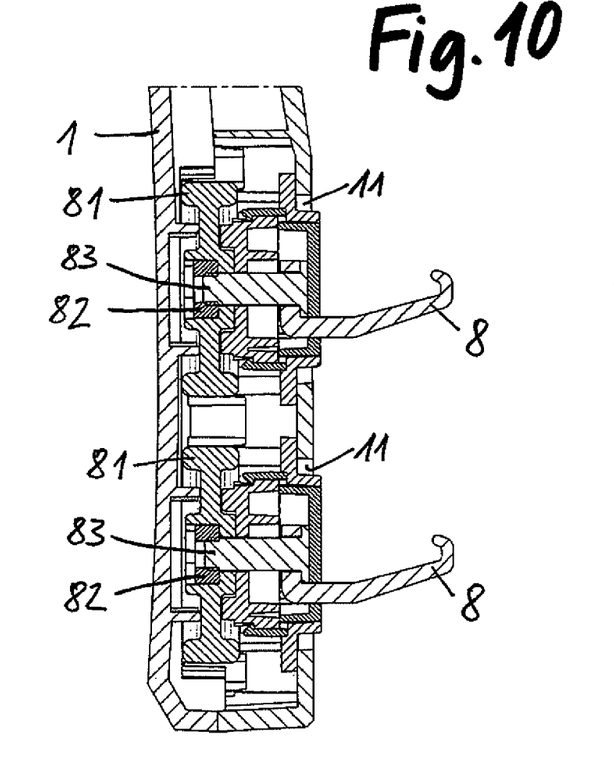
FIGS. 10 and 11 show, in an enlarged sectioned view, the actuating mechanism with the small hand wheels for the holding hooks in the release position (FIG. 10) and the holding position (FIG. 11).
Figure 11:
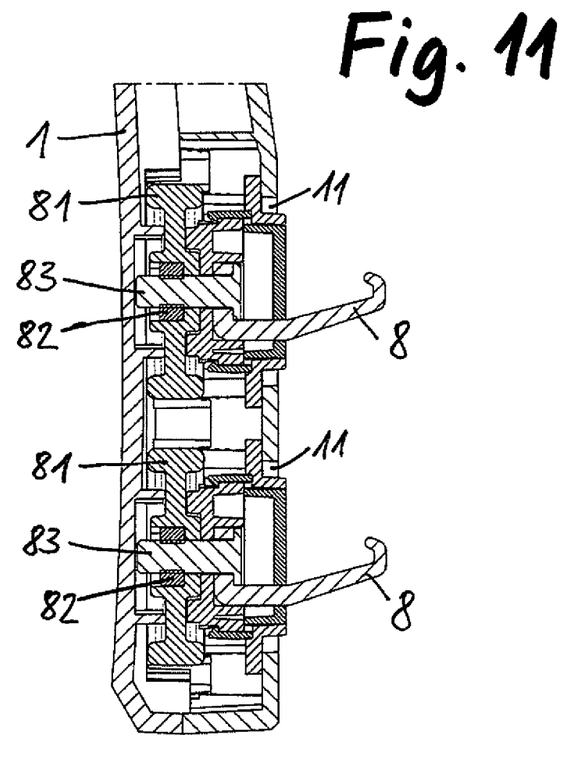

FIGS. 10 and 11 respectively show the actuating mechanism for the holding hooks 8 in a sectioned view. The mechanism consists of the small hand wheel 81 with an integrated screw nut 82 acting on a threaded pin 83 that is moved in the axial direction with rotation of the small hand wheel 81 and is connected to the respective holding hooks 8. By axial displacement of the stem 83, to the right side in the drawing, the holding hook 8 is moved into its release position (FIG. 10), and by movement of the stem 83 to the left in the drawing, it is moved into the holding position (FIG. 11).

The invention claimed is:

1. Ventilation-mounted holder for attachment on a ventilation lamella assembly in vehicles for mounting electronic devices or other articles, the holder comprising:
   a carrier body configured as an elongated carrier arm having a length and a first end region and a second end region opposite said first end region, and
   having a front side and a back side,
   at least two holding brackets each for engagement over a ventilation lamella being arranged on the backside of the carrier body,
   said at least two holding brackets being arranged on said first end region of the carrier arm and being spaced from each other along the carrier arm, said at least two brackets each being rotatably arranged on the carrier arm, and each of the at least two holding brackets is disposed to be displaceable by a small distance in a longitudinal direction of the carrier arm, and a holding device for an electronic device or other article, said holding device being arranged on the front side of the carrier body and on said second end region of the carrier arm, said holding device being arranged on said second end region of the carrier arm.

2. Ventilation-mounted holder according to claim 1, wherein the holding device is connected to the carrier arm by means of a universal joint.

3. Ventilation-mounted holder according to claim 1, wherein the carrier arm is configured as a half-shell construction.

4. Ventilation-mounted holder according to claim 1, wherein each holding bracket is associated with an actuating mechanism comprising a small hand wheel the rotational movement of which is translated into an axial movement of a stem by means of a threaded engagement, wherein the actuating mechanism, in cooperation with the ends of the two holding bracket elements of each holding bracket, opens the holding bracket upon axial movement of the stem in one direction, and closes the bracket upon axial movement of the stem in the other direction.

5. Ventilation-mounted holder according to claim 4, wherein the holding brackets are replaced with holding hooks, and the holding hooks are in each case moveable between a release position and a holding position by means of the small hand wheel via the axially moveable stem.

* * * * *